UNITED STATES PATENT OFFICE.

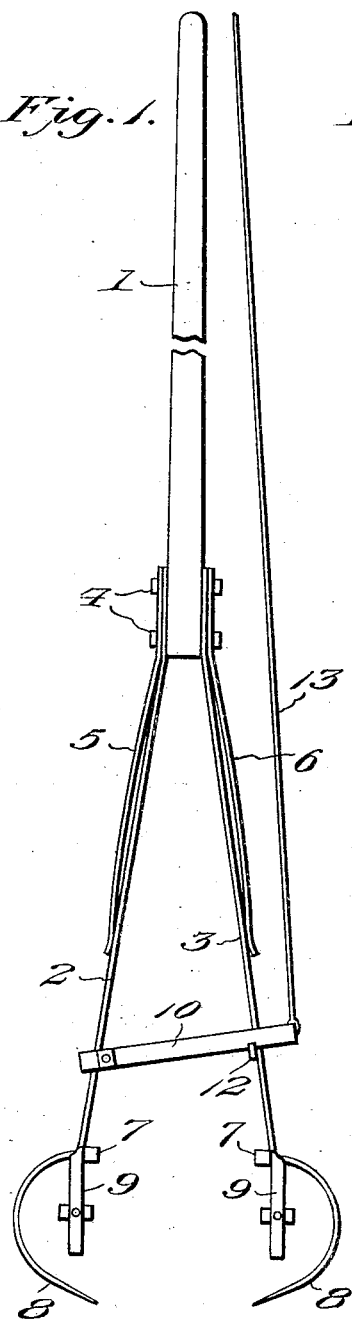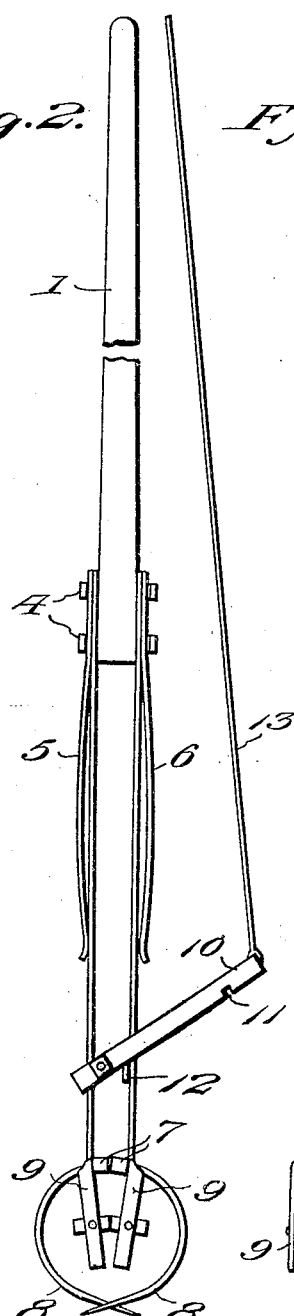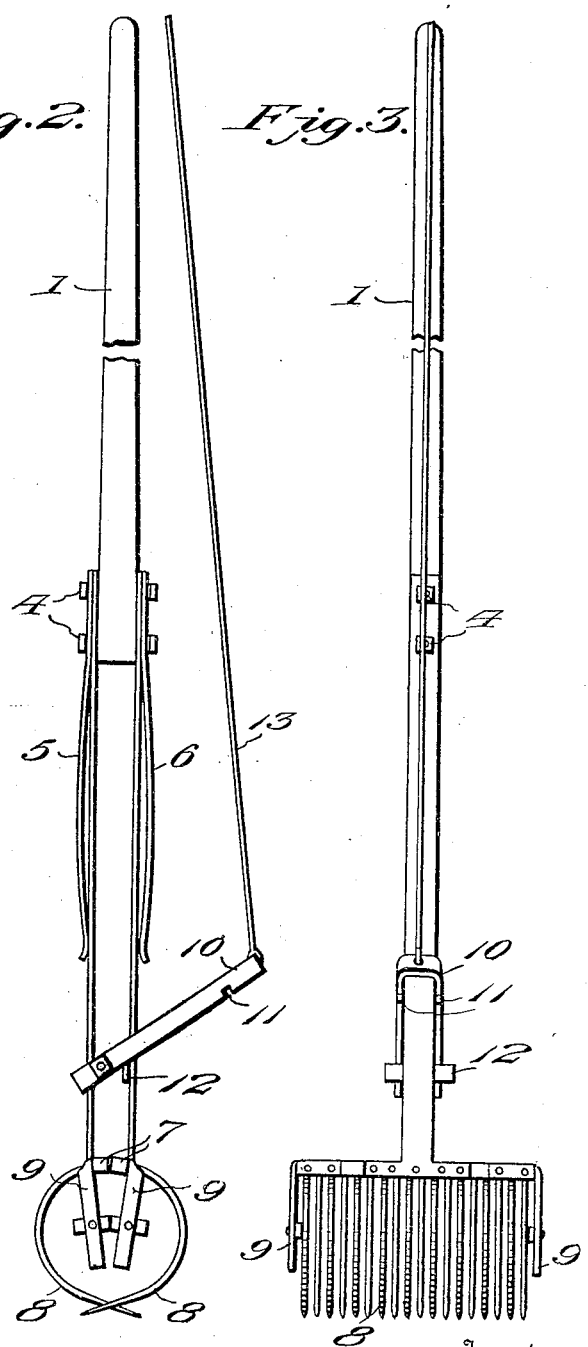

WILLIAM C. FELTON, OF MOUNT VERNON, INDIANA.

TONGS.

No. 823,466.  Specification of Letters Patent.  Patented June 12, 1906.

Application filed September 30, 1905. Serial No. 280,803.

*To all whom it may concern:*

Be it known that I, WILLIAM C. FELTON, a citizen of the United States of America, residing at Mount Vernon, in the county of Posey and State of Indiana, have invented new and useful Improvements in Tongs, of which the following is a specification.

This invention relates to tongs, such as are used by oystermen and those engaged in similar work, and has for its object to provide certain new and useful improvements in this class of devices to enable them to be easily operated and to insure the effectual retaining of the oysters between the jaws.

Another object is to provide tongs the jaws of which will not get out of alinement, thus preventing the registering of the fingers or teeth and the consequent damage thereto.

It is a further object of the invention to provide a device of the character described which is simple in construction, durable, and thoroughly efficient in operation, and which can be manufactured at a comparatively small cost.

With these and other objects in view the invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings accompanying and forming part of this specification, Figure 1 is a side elevation showing the tongs open. Fig. 2 is a similar view showing the tongs closed. Fig. 3 is a front elevation of the tongs, showing the yoke-guide out of engagement with the spring-arm.

Referring to the drawings, in which like numerals of reference indicate corresponding parts throughout the several views, 1 is a handle, and 2 and 3 are spring-arms secured to opposite sides of the lower end of the handle 1 by bolts 4. The arms 2 and 3, which normally exert a pressure inwardly, are reinforced by bow-springs 5 and 6, also secured at their upper ends to handle 1 by bolts 4. The lower or free ends of said springs press against the outer faces of arms 2 and 3.

Secured to the lower ends of arms 2 and 3 and at right angles thereto are finger-bars 7, carrying a plurality of fingers 8, arranged in such position that the ends of the fingers on one bar interlace with the ends of those on the opposite bar when the arms are in their normal position. In the preferred embodiment of my invention the fingers 8 are substantially semicircular in form, having their free ends straight and extending downwardly to cause them to dig deeper as they close upon each other.

In order that the oysters may be held within the basket formed by the closed fingers, guards 9 are secured to the ends of the finger-bars 7, said guards being formed of downwardly-extending arms provided with short cross-pieces, and to prevent the guards from interfering with the operation of the fingers they are made of such length as to leave considerable space between their lower ends and the ends of the fingers.

Pivoted at its open end to spring-arm 2 is a yoke-guide 10, which acts as a guide for arm 3, preventing said arm from getting out of alinement with arm 2. On the under edge of said guide 10 near its free end are provided notches 11, adapted to engage lateral projections 12 on arm 3 to hold the arms apart while the ends of the fingers are being forced into the oyster-beds. A releasing-rod 13, connected to the free end of guide 10, extends upward and is attached to the handle 1, convenient to the operator and in a manner adapted to permit of longitudinal movement.

In practice the device is used as follows: The members 2 and 3 are sprung apart and the notches 11 of yoke-guide 10 caused to engage the lateral projections 12. With the fingers thus separated they are forced into the oyster-bed as far as possible and the releasing-rod 13 drawn upward to disengage the notches 11 and lateral projections 12. As soon as released the spring-arms 2 and 3, assisted by the bow-springs 5 and 6, force the fingers toward each other, and in so doing the downwardly-extending ends of the fingers tend to draw the tongs deeper into the oyster-bed, thus insuring the filling of the basket. As above explained, the guards 9 prevent the oysters from falling out of the sides of the basket without interfering with the successful operation of the device.

Having described my invention, what I claim as new, and desire to secure by Letters Patent, is—

1. Tongs having movable jaws, and a bracing-yoke loosely straddling one jaw and pivotally connected to the other jaw.

2. Tongs having jaws, a bracing-yoke loosely straddling one jaw and carried by the other jaw, and guards carried by said jaws.

3. Tongs having jaws and a bracing-yoke loosely straddling one jaw and carried by the other jaw.

4. Tongs having jaws and a bracing-yoke loosely straddling one jaw and pivotally carried by the other jaw, said yoke having a detachable connection with the first-mentioned jaw to hold the jaws apart, and means to release the yoke from the first-mentioned jaw.

5. Tongs having jaws, projections carried by one of the jaws, a yoke loosely straddling said jaw and pivotally connected to the other jaw, said yoke being provided with notches for detachable engagement with the projections to hold the jaws apart, and means to disengage the yoke from the projections.

In testimony whereof I affix my signature in presence of two witnesses.

WILLIAM C. FELTON.

Witnesses:
A. W. NEUMANN,
E. W. CLEMENTS.